US012597664B2

(12) United States Patent
Schneider

(10) Patent No.: US 12,597,664 B2
(45) Date of Patent: Apr. 7, 2026

(54) REINFORCED CARRIER DEVICE FOR A BATTERY PACK AND PROCESS FOR THE ASSEMBLING OF A REINFORCED BATTERY PACK

(71) Applicant: ArcelorMittal, Luxembourg (LU)

(72) Inventor: Nicolas Schneider, Saint Martin Longueau (FR)

(73) Assignee: ArcelorMittal, Luxembourg (LU)

( * ) Notice: Subject to any disclaimer, the term of this patent is extended or adjusted under 35 U.S.C. 154(b) by 781 days.

(21) Appl. No.: 17/787,528

(22) PCT Filed: Dec. 24, 2019

(86) PCT No.: PCT/IB2019/061326
§ 371 (c)(1),
(2) Date: Jun. 20, 2022

(87) PCT Pub. No.: WO2021/130522
PCT Pub. Date: Jul. 1, 2021

(65) Prior Publication Data
US 2022/0384893 A1 Dec. 1, 2022

(51) Int. Cl.
*H01M 50/242* (2021.01)
*H01M 50/244* (2021.01)
*H01M 50/249* (2021.01)

(52) U.S. Cl.
CPC ....... *H01M 50/242* (2021.01); *H01M 50/244* (2021.01); *H01M 50/249* (2021.01); *H01M 2220/20* (2013.01)

(58) Field of Classification Search
CPC ............. H01M 50/242; H01M 50/244; H01M 50/249; H01M 2220/20; H01M 50/20; B60K 2001/0438
(Continued)

(56) References Cited

U.S. PATENT DOCUMENTS

| | | |
|---|---|---|
| 8,967,312 B2 | 3/2015 | Yanagi et al. |
| 2011/0143179 A1 | 6/2011 | Makamori et al. |

(Continued)

FOREIGN PATENT DOCUMENTS

| | | |
|---|---|---|
| CN | 103568820 A | 2/2014 |
| CN | 105098113 A | 11/2015 |

(Continued)

OTHER PUBLICATIONS

Search Report of PCT/IB2020/061326 dated Oct. 13, 2020.

(Continued)

*Primary Examiner* — Nicholas A Smith
*Assistant Examiner* — Kevin Nguyen
(74) *Attorney, Agent, or Firm* — Davidson Kappel LLC

(57) ABSTRACT

A carrier device including a reinforcement arrangement (9) including: at least two adjacent reinforcement hollow portions (24, 25) both being traversed by the side wall (3) of the carrier device (2) and each made of an inner reinforcement hollow section (26, 27) of the inner reinforcement piece (14) and an outer reinforcement hollow (28, 29) section of the outer reinforcement piece (19), both reinforcement hollow sections being at least partially facing each other, and a longitudinal reinforcement fastening portion (30) located between the adjacent reinforcement hollow portions (24, 25), secured to the side wall (3), and made of an inner reinforcement fastening section (31) of the inner reinforcement piece (14) and an outer reinforcement fastening section (32) of the outer reinforcement piece (19), both reinforcement fastening sections (31, 32) being at least partially facing each other.

21 Claims, 5 Drawing Sheets

(58) Field of Classification Search
USPC ........................................................... 429/7
See application file for complete search history.

(56) References Cited

U.S. PATENT DOCUMENTS

| | | | |
|---|---|---|---|
| 2012/0211128 A1 | 8/2012 | Corquillet et al. | |
| 2013/0229030 A1 | 9/2013 | Yamaguchi et al. | |
| 2014/0014428 A1* | 1/2014 | Yanagi | B60K 1/04 |
| | | | 180/68.5 |
| 2015/0249240 A1 | 9/2015 | Hihara et al. | |
| 2015/0255764 A1 | 9/2015 | Loo et al. | |
| 2015/0340671 A1 | 11/2015 | Subramanian et al. | |
| 2016/0288737 A1 | 10/2016 | Kamimura et al. | |
| 2017/0047623 A1 | 2/2017 | Kim et al. | |
| 2018/0006280 A1 | 1/2018 | Ovada et al. | |
| 2018/0171459 A1 | 6/2018 | Drillet et al. | |
| 2018/0236863 A1 | 8/2018 | Kawabe et al. | |
| 2019/0070651 A1 | 3/2019 | Fortmeier et al. | |
| 2019/0106765 A1 | 4/2019 | Moulin et al. | |
| 2019/0157642 A1* | 5/2019 | Toyota | H01M 50/249 |
| 2019/0210441 A1 | 7/2019 | Ovgard et al. | |
| 2019/0217902 A1 | 7/2019 | Viaux et al. | |
| 2019/0237725 A1 | 8/2019 | Kawaguchi et al. | |

FOREIGN PATENT DOCUMENTS

| | | | |
|---|---|---|---|
| CN | 106274429 | A | 1/2017 |
| CN | 107732079 | A | 2/2018 |
| CN | 108367789 | A | 8/2018 |
| CN | 109501570 | A | 3/2019 |
| CN | 110112333 | A | 8/2019 |
| DE | 102010011890 | A1 | 9/2011 |
| DE | 102013215276 | A1 | 2/2014 |
| DE | 102016115037 | A1 | 2/2018 |
| EP | 2371599 | A1 | 10/2011 |
| EP | 2685523 | A1 | 1/2014 |
| JP | 2011124101 | A | 6/2011 |
| JP | 2015170452 | | 9/2015 |
| JP | 2019147547 | A | 9/2019 |
| KR | 20190070548 | A | 6/2019 |
| WO | WO2012063393 | A1 | 5/2012 |
| WO | WO2017125809 | A | 7/2017 |
| WO | WO 2018029168 | | 2/2018 |
| WO | WO 2018/166888 | | 9/2018 |
| WO | WO 2021/124012 | A1 | 6/2021 |
| WO | WO 2021/130606 | A1 | 7/2021 |

OTHER PUBLICATIONS

See written opinion of PCT/IB2020/061326.
ISR of PCT/IB2020/061725 dated Feb. 2, 2021.
Written opinion of ISA of PCT/IB2020/061725.
ISR of PCT/IB2020/061946 dated Feb. 15, 2021.
Written opinion of ISA of PCT/IB2020/061946.

* cited by examiner

REINFORCED CARRIER DEVICE FOR A BATTERY PACK AND PROCESS FOR THE ASSEMBLING OF A REINFORCED BATTERY PACK

The present invention relates to protection and reinforcement elements in the car industry, and more specifically relates to the protection of a battery pack of an electric or hybrid vehicle.

BACKGROUND

Electrical vehicles or hybrid vehicles have to embed at least one heavy and bulky battery pack. This battery pack is made of a plurality of battery modules, each module housing battery cells. Said battery modules must be very well protected both against physical intrusion that may occur during a car accident and against mechanical shock while the battery pack is moved during assembly to the considered vehicle.

It is known from U.S. patent application Ser. No. 13/940,735 which issued as U.S. Pat. No. 8,967,312 on Mar. 3, 2015 to design a battery pack comprising a plurality of modules inserted in a tray, or tub, comprising a plate bottom and a wall which is upward bent from the peripheral edge of the bottom. The wall is reinforced with an inner frame and an outer frame for better modules protection.

SUMMARY OF THE INVENTION

However, the draft angle of the tray forms a lost zone which is a problem in the optimization of the space when inserting the battery modules in the tray. In addition, the structure of the inner and outer frames fixed to the tub generates mechanical vibration that may be problematic for the modules.

It is an object of the present invention to provide a way to efficiently protect battery modules of the battery pack while optimizing battery modules arrangement of said pack.

The present disclosure provides a reinforced carrier device for a battery pack of an electric or hybrid vehicle, comprising at least:

- a carrier device comprising at least one side wall and a base wall provided to receive a plurality of battery modules of the battery pack,
- a reinforcement structure of said side wall comprising at least an inner reinforcement piece and an outer reinforcement piece extending along at least a part of the side wall, at least partially facing each other, and being respectively secured to opposite faces of said side wall then forming a reinforcement arrangement, wherein the reinforcement arrangement comprises:

- at least two adjacent reinforcement hollow portions both being traversed by the side wall of the carrier device and each made of an inner reinforcement hollow section of the inner reinforcement piece and an outer reinforcement hollow section of the outer reinforcement piece, both reinforcement hollow sections being at least partially facing each other, and
- a longitudinal reinforcement fastening portion located between the adjacent reinforcement hollow portions, secured to the side wall, and made of an inner reinforcement fastening section of the inner reinforcement piece and an outer reinforcement fastening section of the outer reinforcement piece, both reinforcement fastening sections being at least partially facing each other The reinforced carrier device according to the invention may also have the optional features listed below, considered individually or in combination:

- Each reinforcement piece of the reinforcement structure comprises two opposite longitudinal extremities that are secured at least to the side wall.
- The carrier device is a tub having a general rectangular shape extending regarding a longitudinal axis X, and wherein it comprises two longitudinal side walls and two transverse side walls forming a frame.
- The reinforcement structure comprises at least two longitudinal reinforcement arrangements respectively secured to the two longitudinal side walls of the tub.
- The reinforcement structure comprises at least two transverse reinforcement arrangements respectively secured to the two transverse side walls of the tub.
- The reinforced carrier device comprises a through-hole managed both in one of the transverse side walls and in the reinforcement fastening portion of the considered reinforcement arrangement.
- The side wall of the carrier device is inclined with respect to the base wall following a draft angle (a) and is enclosed in a location space delimited by two parallel planes both extending perpendicularly to said base wall, wherein the reinforcement hollow portions of the considered reinforcement arrangement are also enclosed in said location space.
- The inner and outer reinforcement pieces are made of steel having a tensile strength greater than 1500 MPa, preferably greater than 1700 MPa.
- The reinforced carrier device comprises a mesh inserted in the carrier device and comprising a plurality of housing crossmembers forming a plurality of housing members, wherein the inner reinforcement piece is secured to a free end of at least one housing crossmember.

A second subject of the invention consists of a process for the assembling of a reinforced carrier device mentioned above and comprising two transverse side walls, two longitudinal side walls and at least four reinforcement arrangements protecting said side walls, wherein the process comprises at least the following steps:

- (i) providing a first assembly by securing the inner reinforcement pieces of the reinforcement arrangements to the free ends of the housing crossmembers of the mesh,
- (ii) providing a second assembly by securing the outer reinforcement pieces of the reinforcement arrangements to outer faces of the side walls of the carrier device, and
- (iii) inserting the first assembly in the carrier device of the second assembly and securing the inner reinforcement pieces to inner faces of the side walls of said carrier device.

The process for the assembling of the reinforced carrier device according to the invention may also have the optional features listed below, considered individually or in combination:

- The cooling device is secured to an outer face of the base wall of the carrier device of the second assembly.

A third subject of the invention consists of a reinforced battery pack for an electric or hybrid vehicle comprising a plurality of battery modules, and further comprising at least:

- a lower protective element named shield element provided to avoid intrusion into the battery pack, the reinforced carrier device mentioned above, lying on the shield element and housing the battery modules, and a top cover secured to the reinforced carrier device.

The reinforced battery pack according to the invention may also have the optional features listed below, considered individually or in combination:

The reinforced battery pack further comprises:

cooling means lying on the shield element and provided to cool down the battery modules, wherein the reinforced carrier device is lying on the cooling means, and a mesh inserted in reinforced the carrier device, secured to said reinforced carrier device and comprising a plurality of housing crossmembers forming a plurality of housing members, each battery module being housed in a considered housing member.

The cover is secured to a flange of the carrier device.

The reinforced battery pack comprises regularly spaced anti-intrusion crossmembers located between the shield element and the cooling means.

The shield element is made of steel having a tensile strength greater than 1800 MPa.

A fourth subject of the invention consists of a process for the assembling of a reinforced battery pack described above, comprising at least the following steps:

(i) providing a first assembly by securing the anti-intrusion crossmembers (46) to the shield element, (ii) providing a second assembly by:

Positioning the reinforced carrier device described above on the cooling device, then securing said reinforced carrier device to said cooling device, providing the battery modules inside the housings between adjacent housing crossmembers of the mesh, (iii) providing a final assembly by securing the second assembly to the first assembly, (iv) providing a top cover and securing it to the reinforced carrier device.

The process for the assembling of the reinforced battery pack according to the invention may also have the optional features listed below, considered individually or in combination:

Step (iv) is implemented by providing the top cover and securing it to the flange of the carrier device.

BRIEF DESCRIPTION OF THE DRAWINGS

Other characteristics and advantages of the invention will be described in greater detail in the following description.

The invention will be better understood by reading the following description, which is provided purely for purposes of explanation and is in no way intended to be restrictive, with reference to.

DETAILED DESCRIPTION

It should be noted that the terms "lower", "upper", "above", "below", "lowest", "highest", "top", "bottom", "left", "right" as used in this application refer to the positions and orientations of the different parts of the reinforced carrier device, of the battery pack and of the vehicle when they are positioned vertically on the ground. Furthermore, the terms "front", "forward", "rear", "back", "backwards" are defined according to the normal driving direction of a vehicle. The terms "substantially perpendicular" define an angle of $90°+/-15°$ and the terms "substantially parallel" define an angle of $0°+/-15°$.

According to FIGS. 1 to 4, the reinforced carrier device of the invention will now be described in a first embodiment.

The reinforced carrier device 1, 1' of the invention is designed to house and protect battery modules of a battery pack of a hybrid or electric vehicle 60 from mechanical shocks and physical intrusions. The reinforced carrier device 1, 1' is thus a part of a reinforced battery pack 42 a part of which is depicted in FIGS. 6 and 7, as it will be discussed below.

Figure 5:
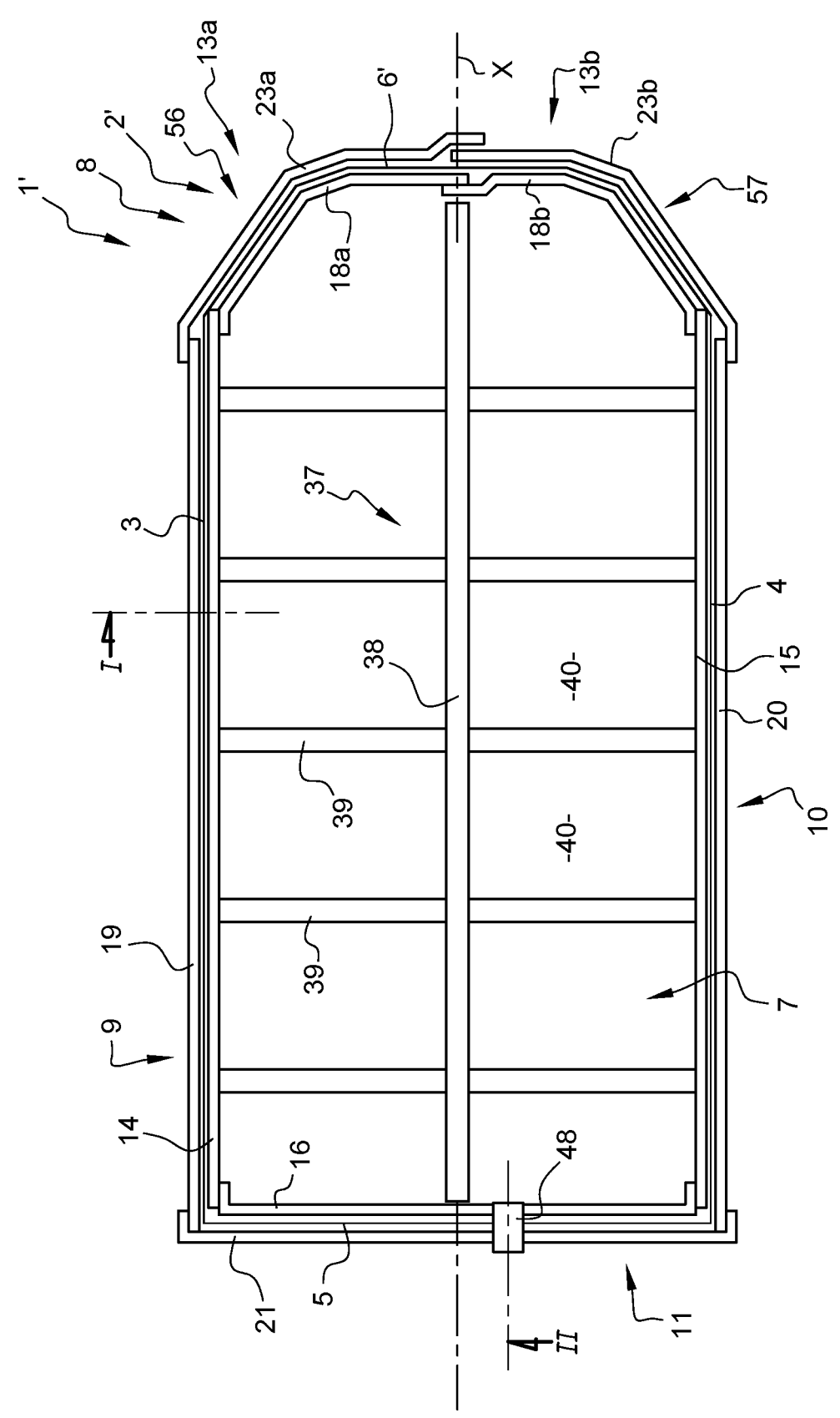
FIG. 5, which is a top view of a second embodiment of the reinforced carrier device of the invention.
Figure 6:
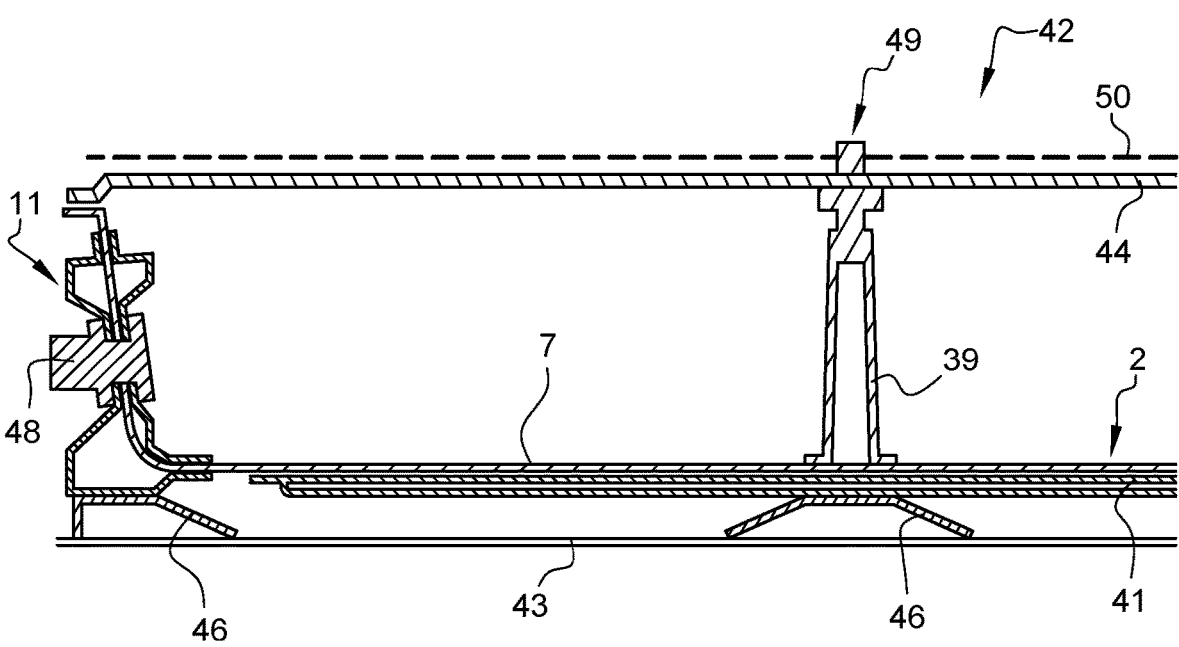
FIG. 6, which is a transverse cross section view of a part of a reinforced battery pack of the invention secured to the floor of a hybrid or electric vehicle.
Figure 7:
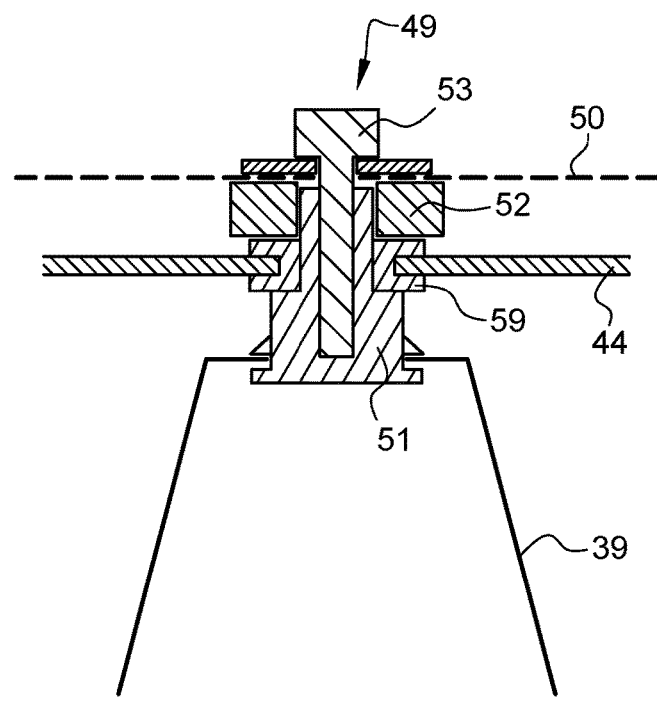
FIG. 7, which is a detail of FIG. 6 showing securing means of the reinforced battery pack to the floor of the vehicle.

The battery pack is a well-known component of electric and hybrid vehicles, and essentially comprises a plurality of modules lying on a carrier device 2, 2' also named tub, said carrier device lying on a protective element further named shield element 43 (depicted in FIG. 6). In addition, a cooling device 41 is inserted between the carrier device 2, 2' (2' shown in FIG. 5, e.g.) and the shield element 43 and secured to an outer face of a base wall 7 of the carrier device 2, 2'.

In a particular embodiment, this shield element 43 is made of fully martensitic steel comprising between 0.15% and 0.5% of carbon in weight. This martensitic steel has a tensile strength greater than 1800 MPa, making the shield element 43 particularly resistant against physical intrusion through the battery pack.

The reinforced carrier device 1, 1' comprises the carrier device 2, 2' commonly named tub and provided to receive the plurality of battery modules of the battery pack. The carrier device 2, 2' comprises the base wall 7 on which the battery modules may lie, and several side walls 3-6, 6' forming a frame at least surrounding the battery modules. The carrier device 2, 2' has preferentially a general rectangular shape, extends regarding a longitudinal axis X and comprises two longitudinal side walls 3, 4 and two transverse side walls 5, 6, 6'. However, and as it will be explained below, this general shape may be different as depicted in FIG. 5.

The carrier device 2, 2' is made of steel and is manufactured by stamping a steel blank, preferably a steel having a tensile strength lower than 1000 MPa in order to make the stamping process easier. Because of the shape of the carrier device 2, 2', and in order to allow demolding of the carrier device 2, 2' after the stamping process, each side wall 3-6, 6' of the carrier device 2, 2' is inclined with respect to the base wall 7 following a draft angle α. Each side walls 3-6, 6' of the carrier device 2, 2' is thus inclined with respect to the base wall 7 following said draft angle α and is enclosed in a space 36 delimited by two parallel planes P1, P2 (FIG.

2) both extending perpendicularly to said base wall 7. In the following, this space 36 will be named location space 36.

Figure 1:
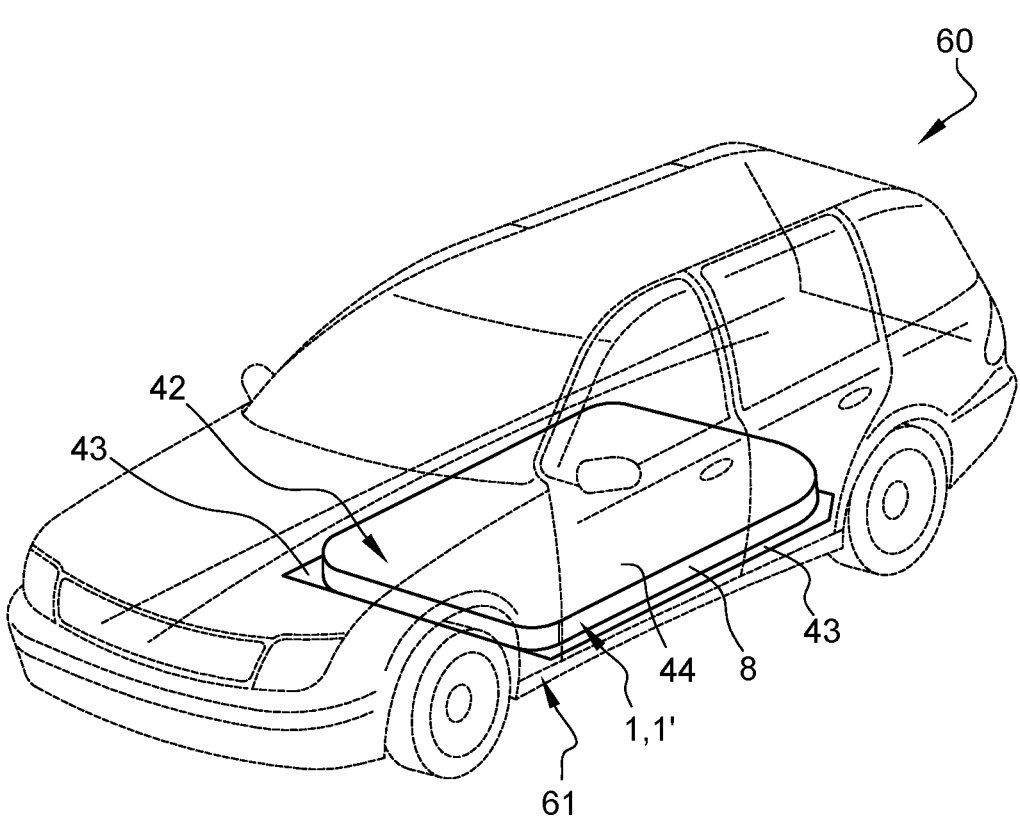
FIG. 1, which represents a perspective view of a body of a vehicle comprising a reinforced battery pack according to the invention.
Figure 2:
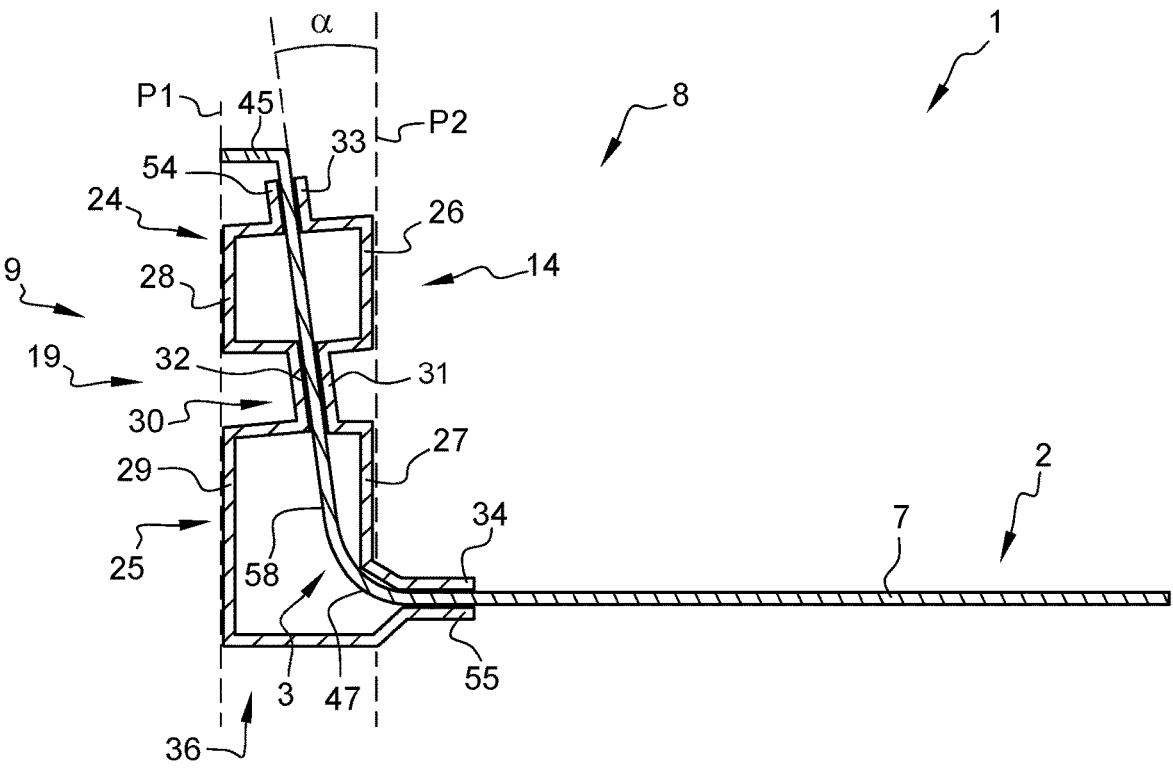
FIG. 2, which represents a transverse cross section of a part following arrow I of a reinforced carrier device according to a first embodiment of the invention.
Figure 3:
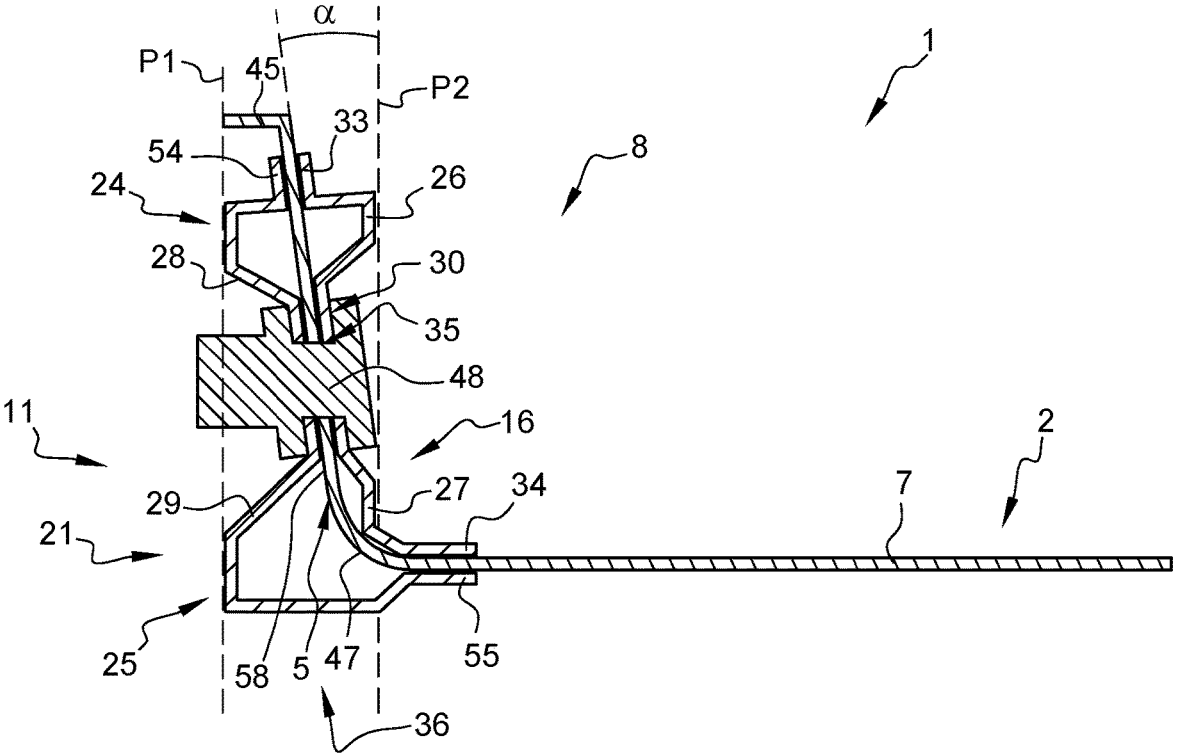
FIG. 3, which represents a longitudinal cross section following arrow II of the reinforced carrier device of FIG. 2.

FIG. 2 depicts a longitudinal side wall 3 following arrow I in FIG. 5, while FIG. 3 depicts a transverse side wall 5 following arrows II in FIG. 5. As depicted in FIGS. 2 and 3, each side wall 3, 5 of the carrier device 2 comprises a linear central portion 58, a curved end portion 47 secured to the base wall 7 and a free end portion 45. As explained further in the description, the free end portion 45 of the side walls 3-6 forms a flange 45 parallel to the base wall 7.

Figure 4:
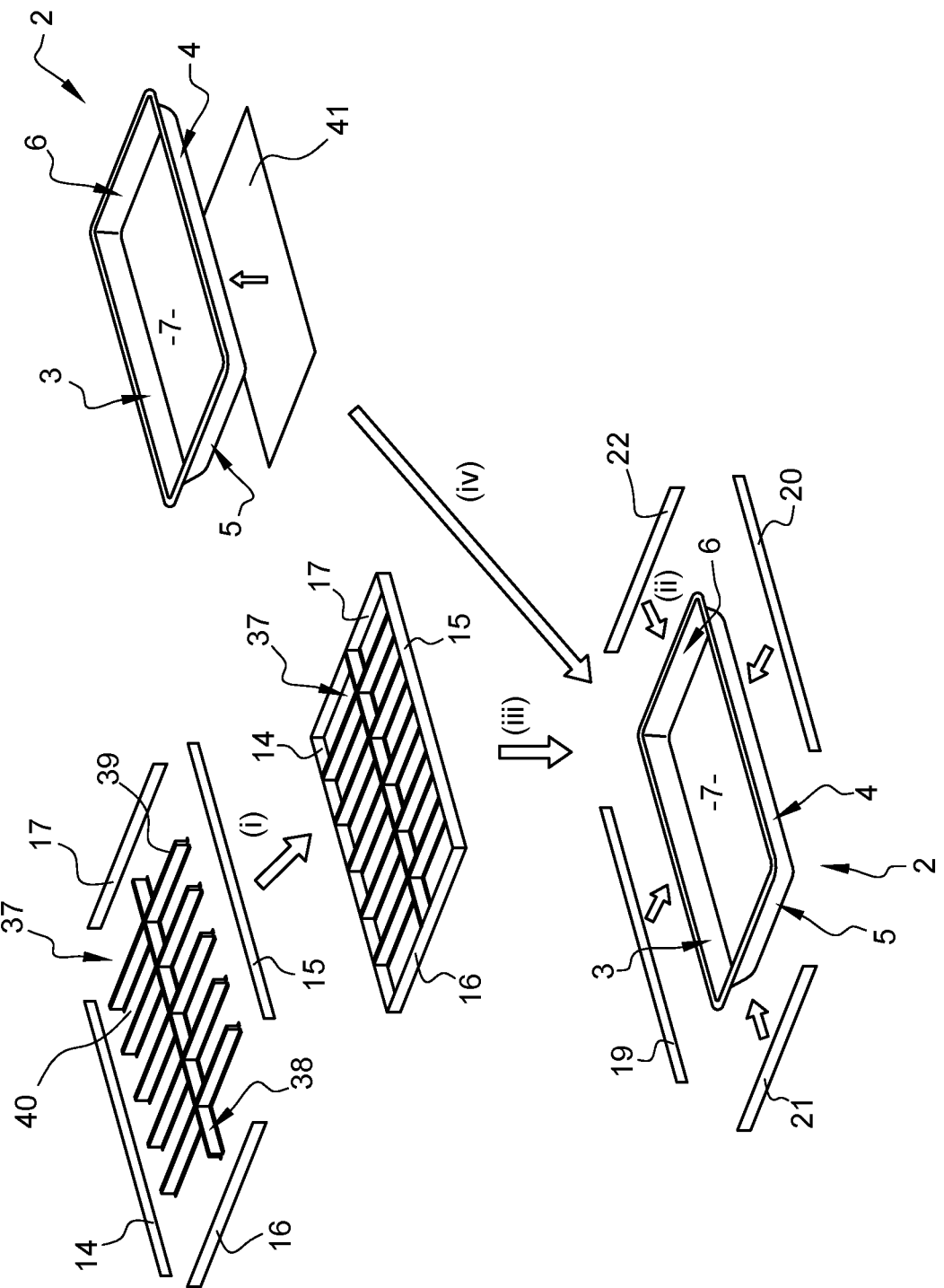
FIG. 4, which is an exploded view of the reinforced carrier device of FIG. 2.

According to FIGS. 2-4, the reinforced carrier device 1 also comprises a reinforcement structure 8 of at least one of the side walls 3-6 of the carrier device 2. This reinforcement structure 8 comprises at least an inner reinforcement piece 14-17 and an outer reinforcement piece 19-22 extending along at least a part of the side wall 3-6. The inner and outer reinforcement pieces 14-17; 19-22 are respectively secured to opposite faces of at least the considered side wall 3-6, are at least partially facing each other and are preferentially facing each other as depicted in FIGS. 2 and 3.

In the following, a couple of inner and outer reinforcement pieces 14-17; 19-22 respectively secured to opposite faces of the considered side wall 3-6 and at least partially facing each other is named a reinforcement arrangement 9-12 and is thus a part of the reinforcement structure 8, since said reinforcement structure 8 comprises several reinforcement arrangement 9-12.

FIG. 2 depicts a longitudinal reinforcement arrangement 9 following arrow I in FIG. 5, while FIG. 3 depicts a transverse reinforcement arrangement 11 following arrows II in FIG. 5. Each reinforcement arrangement 9, 11 comprises two adjacent reinforcement hollow portions 24, 25 both being traversed by the considered side wall 3, 5. In addition, each reinforcement hollow portion 24, 25 is made of an inner reinforcement hollow section 26, 27 of the considered inner reinforcement piece 14, 16 and an outer reinforcement hollow section 28, 29 of the considered outer reinforcement piece 19, 21, both reinforcement hollow sections 26, 28; 25, 29 being at least partially facing each other, and preferentially totally facing each other as depicted in FIGS. 2 and 3. Thanks to this specific arrangement, the two hollow portions 24, 25 are provided to absorb any shock against one or several side walls 3, 5, avoiding any deformation of the carrier device 2.

Each reinforcement arrangement 9, 11 also comprises a reinforcement fastening portion 30 located between the reinforcement hollow portions 24, 25 and secured to the considered side wall 3, 5. This reinforcement fastening portion 30 is made of an inner reinforcement fastening section 31 of the inner reinforcement piece 14, 16 and an outer reinforcement fastening section 32 of the outer reinforcement piece 19, 21, both reinforcement fastening sections 31, 32 being welded to the considered side wall 3, 5. In addition, both reinforcement fastening sections 31, 32 are at least partially facing each other, and preferentially totally facing each other as depicted in FIGS. 2 and 3. Thanks to this specific arrangement, the volume of the two hollow portions 24, 25 is decreased to limit mechanical propagation through the modules of the battery pack. In other words, the reinforcement fastening portion 30 decrease the mechanical vibrations experienced by the battery modules.

In a particular embodiment, the reinforcement pieces 14,15; 19;20 reinforcing the longitudinal side walls, are advantageously manufactured by roll forming a high strength steel. Roll forming is a very productive and economical way of forming high strength steels. The application of this technology is made possible by the fact that the reinforcement pieces 14,15; 19,20 have a continuous section. Because the section of the inner reinforcement pieces 14, 15 can be identical, the same roll forming tool can be used for both these reinforcement pieces, further rationalizing the production tools and lowering the manufacturing costs. Likewise, the outer reinforcement pieces 19, 20 can be made using the same production tools.

In a particular embodiment, which will be detailed later, the reinforcement pieces 16, 18; 21, 23 reinforcing the transversal side walls have a non-continuous section at least at the front or a at the back of the battery pack due to the presence of an electric socket. In this case, it is not possible to roll form said reinforcement pieces. Cold stamping or hot stamping can be used for said reinforcement pieces. Because of the need of high strength steels and of the relatively complex shape of the reinforcement pieces, high strength high formability steels will advantageously be applied, examples of which are given here below.

As an example, the inner and outer reinforcement pieces 14, 15; 19, 20 are roll formed using a fully martensitic steel having a tensile strength greater than 1500 MPa. The composition of this steel is for example in weight percentage:

| | |
|---|---|
| Carbon | Less than 0.28% |
| Manganese | Less than 2% |
| Silicon | Less than 1% |
| Chromium and molybdenum | Less than 1% |
| Titanium and niobium | Less than 0.15% |
| Aluminum | At least 0.010% |
| Sulfur | Less than 0.025% |
| Phosphorus | Less than 0.02% |
| Boron | Less than 0.01% |
| Copper | Less than 0.2% |
| Iron and inevitable impurities coming from the steelmaking process | Remaining |

In another embodiment, the inner and outer reinforcement pieces 14, 15; 19, 20 are roll formed using a harder martensitic steel having a tensile strength greater than 1700 MPa. The composition of this steel is for example in weight percentage:

| | |
|---|---|
| Carbon | Less than 0.35% |
| Manganese | Less than 3% |
| Silicon | Less than 1% |
| Chromium and molybdenum | Less than 1% |
| Titanium and niobium | Less than 0.15% |
| Aluminum | At least 0.010% |
| Sulfur | Less than 0.025% |
| Phosphorus | Less than 0.02% |
| Boron | Less than 0.01% |
| Copper | Less than 0.2% |
| Iron and inevitable impurities coming from the steelmaking process | Remaining |

As an example, the reinforcement pieces 16, 18; 21, 23 are made by cold stamping a material having a chemical composition comprising in weight %: $0.13\% < C < 0.25\%$, $2.0\% < Mn < 3.0\%$, $1.2\% < Si < 2.5\%$, $0.02\% < Al < 1.0\%$, with $1.22\% < Si + Al < 2.5\%$, $Nb < 0.05\%$, $Cr < 0.5\%$, $Mo < 0.5\%$, $Ti < 0.05\%$, the remainder being Fe and unavoidable impurities and having a microstructure comprising between 8% and 15% of retained austenite, the remainder being ferrite, martensite and bainite, wherein the sum of martensite and bainite fractions is comprised between 70% and 92%.

As an example, the reinforcement pieces 16, 18; 21, 23 are made by cold stamping a material having a chemical composition comprising in weight %: %: $0.15\% < C < 0.25\%$, $1.4\% < Mn < 2.6\%$, $0.6\% < Si < 1.5\%$, $0.02\% < Al < 1.0\%$, with 1.0%<Si+Al<2.4%, Nb<0.05%, Cr<0.5%, Mo<0.5%, the remainder being Fe and unavoidable impurities and having a microstructure comprising between 10% and 20% of retained austenite, the remainder being ferrite, martensite and bainite.

The steel grades cited in the above examples have a high strength, so that the reinforcement pieces 14-23 offer protection against any deformation of the carrier device 2, 2' or against any physical intrusion through the battery modules, despite the relative ductility of the carrier device 2, 2'.

The reinforced carrier device 2 in a first variant comprises two longitudinal reinforcement arrangements 9, 10 respectively secured to the two longitudinal side walls 3, 4 of the rectangular carrier device 2. FIG. 3 depicts one longitudinal arrangement 9 secured to one longitudinal side wall 3.

The outer reinforcement pieces 19 of each longitudinal arrangement 9 comprises a first end portion 54 welded to the outer face of the corresponding side wall 3 of the carrier device 2, more precisely just below the flange 45 of said side wall 3. The outer piece 19 also comprise an opposite end portion 55 welded to the outer face of the base wall 7 of the carrier device 2, and two adjacent hollow sections 28, 29 with general trapezoidal shape.

The inner reinforcement piece 14 of each arrangement 9 comprises a first end portion 33 welded to the inner face of the corresponding side wall 3 of the carrier device 2, facing the first end portion 54 of the outer reinforcement piece 19. The inner piece 14 also comprise an opposite end portion 34 welded to the inner face of the base wall 7 of the carrier device 2, and two adjacent hollow sections 26, 27 with general trapezoidal shape respectively facing the two hollow portions 28, 29 of the outer reinforcement piece 19. The outer reinforcement piece 19 also comprises an opposite end portion 55 welded to the outer face of the base wall 7 of the carrier device 2.

In an advantageous manner, the reinforcement hollow portions 24, 25 of the longitudinal reinforcement arrangement 9 are enclosed in the location space 36. Thanks to this specific disposition of the reinforcement hollow portions 24, 25, the total space allowed for the housing of the battery modules is fully optimized.

The reinforcement structure 8 of the reinforced carrier device 1 may also comprise two transverse reinforcement arrangements 11, 12 respectively secured to the two transverse side walls 5, 6 of the rectangular carrier device 2. FIG. 3 depicts one transverse arrangement 11 secured to one transverse side wall 5.

The structure and configuration of the inner and outer reinforcement pieces 16, 21 of those additional reinforcement arrangements 11 are quite similar than those described above in relation with FIG. 2, excepting the following characteristic.

In order to electrically connect the electric motor of the hybrid vehicle 60 to the battery modules of the battery pack, at least an electric wire (non-depicted) must be able to pass both through the carrier device 2 and the considered reinforcement arrangement 11.

The reinforced carrier device 1 thus comprises a through hole 35 (see, e.g., FIG. 3) managed both in one transverse side wall 5 and in the reinforcement fastening portion 30 of the considered reinforcement arrangement 11. An electric socket 48 is thus inserted through the hole 35, said socket 48 being permanently connected to the battery modules and configured to be connected to the electric motor via at least the electric wire. In order to ensure the water tightness of the through hole 35, the outside part of said socket 48 is advantageously made of a material which ensures water tightness such as rubber or an adapted polymer, well known to the man skilled in the art.

Advantageously and as depicted in FIG. 4, the reinforced carrier device 1 of the invention may comprise a mesh 37 inserted in the carrier device 2. This mesh 37 is lying on the base wall 7 of the carrier device 2 and comprises a longitudinal member 38 and a plurality of housing crossmembers 39 secured to said longitudinal member 38. The housing crossmembers 39 forms a plurality of regularly dispatched housing members 40 each provided to house at least a battery module.

The two inner reinforcement pieces 16, 17 welded to the transverse side walls 5, 6 of the carrier device 2 are also respectively secured to the two opposite ends of the longitudinal member 38 of the mesh 37. In addition, the two other inner reinforcement pieces 14, 15 welded to the longitudinal side walls 3, 4 of the carrier device 2 are welded to the free ends of the housing crossmembers 39 of the mesh 37. Advantageously, the longitudinal member 38 of the mesh 37 is a longitudinal reinforcement member of the carrier device 2.

A process for the assembling of the reinforced carrier device 1 will now be described regarding FIG. 4.

In a first step, a first assembly is provided by welding the inner reinforcement pieces 16, 17 of the reinforcement structure to the free ends of both the housing crossmembers 39 and the longitudinal member 38 of the mesh 37.

In a second step, a second assembly is provided by welding the outer reinforcement pieces 14,15 of the reinforcement structure to the outer faces of the considered side walls 3, 4 of the carrier device 2. During this second step, the cooling device 41 may optionally be secured to the outer face of the base wall 7 of the carrier device 2.

In a third and last step, the first assembly is inserted in the carrier device 2 in order to lie on the base wall 7, then the inner reinforcement pieces 16, 17 are welded to the inner faces of the considered side walls 5, 6 of the carrier device 2.

As depicted in FIG. 5, a second embodiment of the reinforced carrier device 1' will now be described.

The difference between the second embodiment and the first embodiment of the reinforced carrier device 1 depicted in FIGS. 2 to 4 is the shape of the carrier device 1': two adjacent corners 56, 57 are chamfered so that one of the transverse side walls 6' is not linear anymore but curved. In order to reinforce this curved side wall 6', at least one, preferably two curved reinforcement arrangements 13a, 13b are provided. Each reinforcement piece 18a, 18b, 23a, 23b of the considered arrangement 13a, 13b is also curved in order to follow the shape of the considered curved side wall 6'.

The two adjacent curved reinforcement arrangement 13a, 13b respectively comprise two inner reinforcement pieces 18a, 18b welded together by two first ends. In addition, the first end of one of the inner reinforcement pieces 18b is secured to the longitudinal member 38 of the mesh 37. The two opposite ends of said inner pieces 18a, 18b are respectively secured to first ends of the inner reinforcement pieces 14, 15 of the two reinforcement arrangements 9, 10 strengthening the longitudinal side walls 3, 4 of the carrier device 2'.

The two adjacent curved reinforcement arrangement 13a, 13b respectively comprise two outer reinforcement pieces 23a, 23b welded together by two first ends. The two opposite ends of said outer pieces 23a, 23b are respectively secured to first ends of the outer reinforcement pieces 19, 20 of the two reinforcement arrangements 9, 10 strengthening the longitudinal side walls 3, 4 of the carrier device 2'.

Finally, the opposite ends of the inner and outer pieces 14, 15; 19, 20 of the reinforcement arrangements 9, 10 are respectively welded to opposite ends of both the inner piece 16 and the outer piece 21 of the reinforcement arrangement 11.

According to the invention and as depicted in FIG. 6, the reinforced carrier device 1 of the invention may be a part of a known battery pack then forming a reinforced battery pack 42. The reinforced battery pack 42 extends regarding the same longitudinal axis X than that of the reinforced carrier device 1.

The reinforced battery pack comprises:

the shield element described above 43;

the cooling means 41 described above lying on the shield element 43 and provided to cool down the battery modules. As an example, the cooling means 41 comprises two thermal conducting elements named cladding elements secured to each other and a cooling system (not represented) inserted between the two cladding elements;

regularly spaced anti-intrusion crossmembers 46 secured to the shield element 43 and located between said shield element 43 and the cooling means 41;

the reinforced carrier device 1 of the invention, lying on and secured to the cooling means 41;

the mesh 37 described above and inserted in the reinforced carrier device 1. Preferably, the transverse housing cross members 39 of the mesh 37 are aligned with the anti-intrusion crossmembers 46, so that in case of an intrusion coming from the bottom of the vehicle 60, said anti-intrusion crossmembers 46 and transverse housing cross members 39 collaborate together to provide optimal resistance.

a plurality of battery modules. Each battery module is housed in the considered housing member 40 and is facing the cooling means 41.

Finally, the reinforced battery back 42 comprises a top plate also named top cover 44 that is secured to the flange 45 of the reinforced carrier device 1. In another and preferred embodiment, the top cover 44 may be secured to the reinforced carrier device 1 by bolting it to at least one housing crossmember 39 of the mesh 37. In this last embodiment, it is possible to remove the top cover 44 in case maintenance of the battery modules or other elements is necessary.

According to the invention, a process for assembling the reinforced battery pack 42 will now be described.

In a first step, a first assembly is provided by securing the anti-intrusion crossmembers 46 to the shield element 43 (see, e.g., FIG. 6).

In a second step, a second assembly is provided following the sub-steps of:

providing the reinforced carrier device 1 on the cooling device 41, then securing said reinforced carrier device 1 to said cooling device 41, and providing the battery modules inside the housings 40 of the mesh 37 secured to the carrier device 2.

In a third step, the first assembly is secured to the second assembly, in order to provide a final assembly. More precisely, the anti-intrusion crossmembers 46 are welded to the cooling device 41.

In a fourth and final step, the top plate 44 is secured to the reinforced carrier device 1, for example by bolting said top plate 44 to the flange 45 of the carrier device 2. Advantageously, the top plate 44 is preferably bolted to at least one housing crossmember 39 of the mesh 37.

The reinforced battery pack 42 is then protected against any physical shock and against any physical intrusion and can be securely moved during any further assembling process of the reinforced battery pack 42.

Of course, the reinforced battery pack 42 is not limited to the embodiment described above, and modifications can be brought within the context of the invention. As an example, the top plate 44 may be optional and the cooling device 41 may be differently manufactured.

According to another process of the invention, the reinforced battery pack 42 may be assembled to the body 61 of the vehicle 60.

The body 61 of the vehicle 60, also known as "body in white" refers to car body's components that have been joined together, using one or a combination of different techniques: welding, riveting, clinching, bonding, laser brazing . . . .

The body 61 of the vehicle 60 extends regarding a longitudinal axis and comprises a floor 50, at least a pair of rear longitudinal rails and a pair of front longitudinal rails. The front rails are in the front of the vehicle 60 and the rear rails are located towards the rear of the vehicle 60. The two pairs of rails are thus opposite to each other and provided to absorb shocks coming from the front and from the rear. In addition, the body 61 of the vehicle 60 comprises two longitudinal edge rails, commonly referred to as side sills, secured to the floor 50 and positioned opposite to each other. Those edge rails are provided to absorb lateral shocks.

In a first step, the reinforcement battery pack 42 is positioned in the body 61 of the vehicle 60 so that the longitudinal axis X of the reinforced carrier device 1 is parallel to the longitudinal axis of the vehicle 60. Once positioned, the corners of the reinforced carrier device 1 are respectively in contact with an extremity of the rear longitudinal rails and with an extremity of the front longitudinal rails.

In a second and last step, the shield element 43 of the reinforced battery pack 42 is secured to the longitudinal edge rails of the body 61 of the vehicle 60, and as depicted in FIGS. 6 and 7 the top cover 44, the considered housing crossmember 39 of the mesh 37 and the floor 50 of the vehicle 60 are bolted together with securing means 49. Said securing means 39 comprise a fixing spindle 51 secured to the top of the housing crossmember 39 and going through an orifice managed in the top cover 44 of the reinforced battery pack 42. An annular spacer 52 is thus added around the spindle 51 in order to provide space between the top cover 44 and the floor 50 of the vehicle 60. Finally, a second orifice facing the orifice of the top cover 44 is managed in the floor 50 and a screw 53 passing through this second orifice is bolted to the fixing spindle 51, in order to secure the reinforced battery pack 42 to the floor 50 of the vehicle 60. The water tightness of the inside of the battery pack is essential to guarantee its good functioning and to ensure a long functional life to the battery pack. In order to ensure that the above described assembly is water tight, a seal 59 is provided between the spacer 52 and the fixing spindle 51, ensuring the water tightness of the orifice within the top cover 44.

The reinforcement carrier device 1, 1' of the invention is of great interest to reinforce battery packs of any electric or hybrid vehicle 60.

When integrated to the battery pack alone in order to form the reinforced battery pack 42, said battery is secured during any displacement. In addition, when the reinforced battery pack 42 is assembled to the vehicle 60, the reinforced carrier device 1, 1' offers greater protection against deformation of the carrier device 2, 2' and against intrusion inside the reinforced battery pack 42 in the eventuality of a car accident inducing either front shocks, rear shocks or lateral shocks.

What is claimed is:

1. A reinforced carrier device for a battery pack of an electric or hybrid vehicle, the reinforced carrier device comprising at least:

a carrier device including at least one side wall and a base wall provided to receive a plurality of battery modules of the battery pack;

a reinforcement structure of the side wall including at least an inner reinforcement piece and an outer reinforcement piece extending along at least a part of the side wall, at least partially facing each other, and being respectively secured to opposite faces of the side wall then forming a reinforcement arrangement, wherein the reinforcement arrangement includes:

at least two adjacent reinforcement hollow portions both being traversed by the side wall of the carrier device and each made of an inner reinforcement hollow section of the inner reinforcement piece and an outer reinforcement hollow section of the outer reinforcement piece, the inner and outer reinforcement hollow sections at least partially facing each other, and a longitudinal reinforcement fastening portion located between the adjacent reinforcement hollow portions, secured to the side wall, and made of an inner reinforcement fastening section of the inner reinforcement piece and an outer reinforcement fastening section of the outer reinforcement piece, the inner and outer reinforcement fastening sections at least partially facing each other.

2. The reinforced carrier device as recited in claim 1 wherein each reinforcement piece of the reinforcement structure includes two opposite longitudinal extremities secured at least to the side wall.

3. The reinforced carrier device as recited in claim 1 wherein the carrier device is a tub having a general rectangular shape extending in a longitudinal axis X, and the at least one side wall including two longitudinal side walls and two transverse side walls forming a frame.

4. The reinforced carrier device as recited in claim 3 wherein the reinforcement structure includes at least two longitudinal reinforcement arrangements respectively secured to the two longitudinal side walls of the tub.

5. The reinforced carrier device as recited in claim 4 wherein the reinforcement structure includes at least two transverse reinforcement arrangements respectively secured to the two transverse side walls of the tub.

6. The reinforced carrier device as recited in claim 5 further comprising comprises a through-hole both in one of the two transverse side walls and in the reinforcement fastening portion of the respective transverse reinforcement arrangement.

7. The reinforced carrier device as recited in claim 1 wherein the side wall of the carrier device is inclined with respect to the base wall following a draft angle and is enclosed in a location space delimited by two parallel planes both extending perpendicularly to the base wall, wherein the reinforcement hollow portions of the reinforcement arrangement are also enclosed in the location space.

8. The reinforced carrier device according to claim 1, wherein the inner and outer reinforcement pieces are made of steel having a tensile strength greater than 1500 MPa.

9. The reinforced carrier device as recited in claim 1 further comprising a mesh inserted in the carrier device and a plurality of housing crossmembers forming a plurality of housing members, wherein the inner reinforcement piece is secured to a free end of at least one of the housing crossmembers.

10. A method for assembling the reinforced carrier device as recited in claim 9, the carrier device including two transverse side walls, two longitudinal side walls and at least four reinforcement arrangements protecting the side walls, the method comprising the following steps:

(i) providing a first assembly by securing the inner reinforcement pieces of the reinforcement arrangements to the free ends of the housing crossmembers of the mesh;

(ii) providing a second assembly by securing the outer reinforcement pieces of the reinforcement arrangements to outer faces of the side walls of the carrier device; and (iii) inserting the first assembly in the carrier device of the second assembly and securing the inner reinforcement pieces to inner faces of the side walls of the carrier device.

11. The method as recited in claim 10 further comprising (iv) securing a cooling device to an outer face of the base wall of the carrier device of the second assembly.

12. A reinforced battery pack for an electric or hybrid vehicle, the reinforced battery pack comprising:

a plurality of battery modules;

a lower protective element defining a shield element provided to avoid intrusion into the battery pack;

the reinforced carrier device as recited in claim 1 lying on the shield element and housing the battery modules; and a top cover secured to the reinforced carrier device.

13. The reinforced battery pack as recited in claim 12 further comprising:

a cooling device lying on the shield element and provided to cool down the battery modules, the reinforced carrier device lying on the cooling device; and a mesh inserted in the reinforced carrier device, secured to the reinforced carrier device and including a plurality of housing crossmembers forming a plurality of housing members, each battery module being housed in a respective one of the housing members.

14. The reinforced battery pack as recited in claim 12 wherein the top cover is secured to a flange of the carrier device.

15. The reinforced battery pack as recited in claim 12 further comprising regularly spaced anti-intrusion crossmembers located between the shield element and a cooling device.

16. The reinforced battery pack as recited in claim 12 wherein the shield element is made of steel having a tensile strength greater than 1800 MPa.

17. A method for assembling of the reinforced battery pack as recited in claim 12, comprising the following steps:

(i) providing a first assembly by securing the anti-intrusion crossmembers to the shield element, (ii) providing a second assembly by:

positioning the reinforced carrier device on a cooling device, then securing the reinforced carrier device to the cooling device, providing the battery modules inside the housings between adjacent housing crossmembers of the mesh;

(iii) providing a final assembly by securing the second assembly to the first assembly; and (iv) providing a top cover and securing the top cover to the reinforced carrier device.

18. The method as recited in claim 17 wherein the top cover is secured to a flange of the carrier device.

19. The reinforced battery pack as recited in claim 13 further comprising regularly spaced anti-intrusion crossmembers located between the shield element and the cooling device.

20. A method for assembling of the reinforced battery pack as recited in claim 13, comprising the following steps:

(i) providing a first assembly by securing the anti-intrusion crossmembers to the shield element, (ii) providing a second assembly by:

positioning the reinforced carrier device on the cooling device, then securing the reinforced carrier device to the cooling device, providing the battery modules inside the housings between adjacent housing crossmembers of the mesh;

(iii) providing a final assembly by securing the second assembly to the first assembly; and (iv) providing a top cover and securing the top cover to the reinforced carrier device.

21. The reinforced carrier device according to claim 1, wherein the inner and outer reinforcement pieces are made of steel having a tensile strength greater than 1700 MPa.

\* \* \* \* \*